(12) United States Patent
Zhu et al.

(10) Patent No.: US 12,425,396 B2
(45) Date of Patent: Sep. 23, 2025

(54) BIOMETRIC FEATURE VERIFICATION METHOD AND APPARATUS, ELECTRONIC DEVICE, AND STORAGE MEDIUM

(71) Applicant: Beijing Xiaomi Mobile Software Co., Ltd., Beijing (CN)

(72) Inventors: Yajun Zhu, Beijing (CN); Lei Yu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 408 days.

(21) Appl. No.: 17/928,917

(22) PCT Filed: Jun. 10, 2020

(86) PCT No.: PCT/CN2020/095453
§ 371 (c)(1),
(2) Date: Nov. 30, 2022

(87) PCT Pub. No.: WO2021/248382
PCT Pub. Date: Dec. 16, 2021

(65) Prior Publication Data
US 2023/0231846 A1 Jul. 20, 2023

(51) Int. Cl.
*H04L 9/40* (2022.01)
(52) U.S. Cl.
CPC ................. *H04L 63/0861* (2013.01)
(58) Field of Classification Search
CPC ................................. H04L 63/0861
See application file for complete search history.

(56) References Cited

U.S. PATENT DOCUMENTS

| | | | | |
|---|---|---|---|---|
| 9,935,947 | B1* | 4/2018 | Machani | H04L 63/0861 |
| 2009/0300737 | A1* | 12/2009 | Crandell | H04L 63/0861 |
| | | | | 707/999.01 |
| 2018/0137382 | A1* | 5/2018 | Nowak | H04L 63/00 |
| 2019/0241558 | A1* | 8/2019 | Cyr | A61P 1/16 |

FOREIGN PATENT DOCUMENTS

| | | |
|---|---|---|
| CA | 2879779 A1 | 7/2016 |
| CN | 101567033 A | 10/2009 |
| CN | 106909820 A | 6/2017 |
| CN | 107122647 A | 9/2017 |
| CN | 108475309 A | 8/2018 |
| CN | 109421663 A | 3/2019 |
| CN | 111819574 A | 10/2020 |
| EP | 2887249 A1 | 6/2015 |
| WO | 2017/004860 A1 | 1/2017 |
| WO | 2019142127 A1 | 7/2019 |

* cited by examiner

*Primary Examiner* — Hee K Song
(74) *Attorney, Agent, or Firm* — Volpe Koenig (57) ABSTRACT

The biometric feature verification method includes: extracting a first biometric feature from collected data; sending a second biometric feature to a second end according to the first biometric feature, the second biometric feature being the first biometric feature or being determined according to the first biometric feature; and receiving a result of verification performed by the second end on the second biometric feature by combining a first part of a sample feature and a second part of the sample feature stored in the second end, the first part being stored in the first end or a third end.

14 Claims, 8 Drawing Sheets

BIOMETRIC FEATURE VERIFICATION METHOD AND APPARATUS, ELECTRONIC DEVICE, AND STORAGE MEDIUM

CROSS-REFERENCE

The present application is a U.S. National Stage of International Application No. PCT/CN2020/095453, filed on Jun. 10, 2020, the contents of all of which are incorporated herein by reference in their entireties for all purposes.

BACKGROUND

With increasingly higher demands for accuracy and reliability of public security and identity authentication in the modern society, traditional identity authentication modes such as passwords and magcards are far from meeting social needs due to being susceptible to theft and forgery and other factors. Biometric features represented by fingerprints, human faces, irises, veins, voiceprints, behaviors and the like play a more and more significant role in identity authentication with their uniqueness, robustness, collectability, high credibility, and high accuracy and have got more and more attention. However, there is still a security problem caused by stealing and/or tampering the biometric features during application of the biometric features.

SUMMARY

Examples of the disclosure relate to but are not limited to the field of wireless communication, in particular to a biometric feature verification method and apparatus, an electronic device and a storage medium.

An example of the disclosure provides a biometric feature verification method, including:
 extracting a first biometric feature from collected data;
 sending a second biometric feature to a second end according to the first biometric feature, in which the second biometric feature is the first biometric feature or is determined according to the first biometric feature; and
 receiving a result of verification performed by the second end on the second biometric feature by combining a first part of a sample feature and a second part of the sample feature stored in the second end, in which the first part is stored in a first end or a third end.

A second aspect of an example of the disclosure provides a biometric feature verification method, including:
 receiving a second biometric feature sent by a first end, in which the second biometric feature is a first biometric feature or is determined according to the first biometric feature;
 receiving a first part of the sample feature stored in a third end;
 obtaining the sample feature by combining the first part and the second part of the sample feature stored in the second end; and
 returning a result of verification to the first end according to a matching result between the second biometric feature and the sample feature.

A third aspect of an example of the disclosure provides a communication device, including a processor, a transceiver, a memory and an executable program stored on the memory and capable of being run by the processor, in which the processor, when running the executable program, executes the biometric feature verification method provided by the first aspect and/or the second aspect.

A fourth aspect of an example of the disclosure provides a non-transitory computer storage medium, in which the non-transitory computer storage medium stores an executable program, and the executable program, after being executed by a processor, can implement the biometric feature verification method provided by the first aspect and/or the second aspect.

BRIEF DESCRIPTION OF THE DRAWINGS

Accompanying drawings here, which are incorporated in and constitute a part of the specification, illustrate examples consistent with the disclosure and, together with the specification, serve to explain principles of the examples of the disclosure.

DETAILED DESCRIPTION

The examples will be described in detail here, and their instances are shown in the accompanying drawings. Unless otherwise indicated, when the following description refers to the accompanying drawings, the same number in the different drawings represents the same or similar elements. Implementations described in the following examples do not represent all implementations consistent with the examples of the disclosure. Rather, they are merely examples of an apparatus and method consistent with some aspects of the examples of the disclosure as detailed in appended claims.

Terms used in the examples of the disclosure are merely intended to describe specific examples instead of limiting the examples of the disclosure. The singular such as "a/an" and "the" used in the examples of the disclosure and appended claims also intends to include a plural form unless other meanings are clearly indicated in context. It should be further understood that a term "and/or" used here refers to and contains any one or all possible combinations of one or more associated listed items.

It should be understood that various information, possibly described by using terms such as first, second and third in the examples of the disclosure, are not supposed to be limited to these terms. These terms are merely used for distinguishing information of the same type. For example, without departing from the scope of the examples of the disclosure, first information may also be called second information, and similarly, the second information may also be called the first information. Depending on the context, words "if" and "in case" used here may be constructed as "during . . . ", "when . . . " or "in response to determining".

In order to better describe any one example of the disclosure, one example of the disclosure makes description by taking an application scenario of an intelligent control system of an electricity meter as an example.

Figure 1:
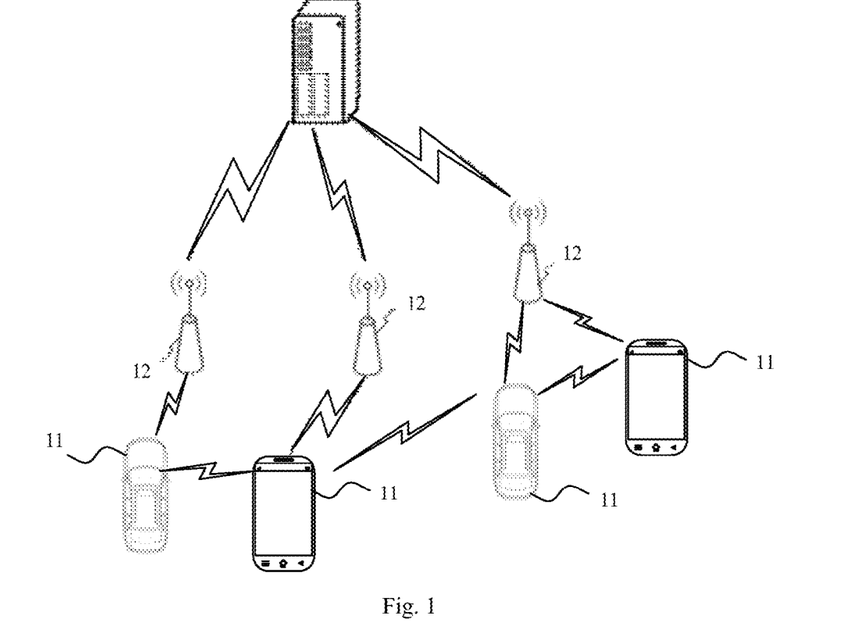
FIG. 1 is a schematic structural diagram of a wireless communication system shown according to an example.
Figure 2:
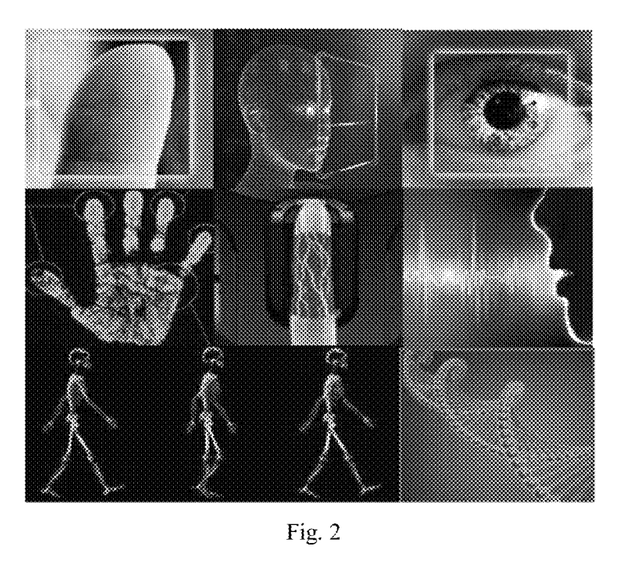
FIG. 2 is a schematic diagram of various types of biometric features shown according to an example.

Please refer to FIG. 1, which shows a schematic structural diagram of a wireless communication system provided by an example of the disclosure. As shown in FIG. 1, the wireless communication system is a communication system based on a cellular mobile communication technology and may include: a plurality of terminals 11 and a plurality of base stations 12.

The terminal 11 may refer to a device providing a voice and/or data connectivity for a user. The terminal 11 may communicate with one or more core networks via a radio access network (RAN). The terminal 11 may be an Internet of Things terminal, such as a sensor device, a mobile phone (or called a "cell" phone) and a computer with the Internet of Things terminal, for example, the terminals may be a fixed, portable, pocket, hand-held, computer built-in or on-board apparatus. For example, the terminal may be a station (STA), a subscriber unit, a subscriber station, a mobile station, a mobile, a remote station, an access point, a remote terminal, an access terminal, a user terminal, a user agent, a user device, or user equipment (UE). Or the terminal 11 may also be a device of an unmanned aerial vehicle. Or the terminal 11 may also be an on-board device, for example, may be a trip computer with a wireless communication function, or a wireless terminal externally connected with the trip computer. Or the terminal 11 may also be a road-side infrastructure, for example, may be a street lamp, signal lamp or other road-side infrastructures with a wireless communication function.

The base station 12 may be a network side device in a wireless communication system. The wireless communication system may be the 4th generation (4G) mobile communication system, also called a long term evolution (LTE) system; or the wireless communication system may also be a 5G system, also called a new radio (NR) system or a 5G NR system. Or the wireless communication system may also be a next generation system of the 5G system. An access network in the 5G system may be called a new generation-radio access network (NG-RAN).

The base station 12 may be an evolution base station (eNB) adopted in the 4G system. Or the base station 12 may also be a base station (gNB) adopting a centralized distributed architecture in the 5G system. When adopting the centralized distributed architecture, the base station 12 usually includes a central unit (CU) and at least two distributed units (DU). Protocol stacks of a packet data convergence protocol (PDCP) layer, a radio link control (RLC) protocol layer and a media access control (MAC) layer are arranged in the central unit, a physical (PHY) layer protocol stack is arranged in the distributed units, and the examples of the disclosure do not limit a specific implementation of the base station 12.

A wireless connection may be established between the base station 12 and the terminal 11 through a wireless air interface. In different implementations, the wireless air interface is a wireless air interface based on a fourth generation (4G) mobile communication network technology standard; or the wireless air interface is a wireless air interface based on a fifth generation (5G) mobile communication network technology standard, for example, the wireless air interface is a new radio; or the wireless air interface may also be a wireless air interface based on a next generation mobile communication network technology standard of 5G.

In some examples, an end to end (E2E) connection may also be established between the terminals 11. For example, there are scenes of vehicle to vehicle (V2V) communication, vehicle to Infrastructure (V2I) communication and vehicle to pedestrian (V2P) communication and the like in vehicle to everything (V2X) communication.

In some examples, the above wireless communication system may also contain a network management device 13.

The plurality of base stations 12 are connected with the network management device 13 respectively. The network management device 13 may be a core network device in the wireless communication system, for example, the network management device 13 may be a mobility management entity (MME) in an evolved packet core (EPC). Or the network management device may also be other core network devices, for example, a serving gateway (SGW), a public data network gateway (PGW), a policy and charging rules function (PCRF) unit or a home subscriber server (HSS), etc. The examples of the disclosure do not limit an implementation form of the network management device 13.

A biometric feature recognition technology refers to extracting individual physiological features or individual behavior characteristics by using an automatic technology for the purpose of identity recognition, and these features or characteristics are compared with template data which have already existed in a database, so that a process of identity authentication and recognition is completed. Theoretically, all physiological features and individual behavior characteristics with universality, uniqueness, robustness and collectability are collectively called biometric features. Different from a traditional recognition mode, the biometric feature recognition uses human own individual characteristics for identity authentication. A general-purpose biometric feature recognition system is supposed to contain subsystems of data collection, data storage, comparison, decision-making and the like.

The biometric feature recognition technology involves a wide range of contents, including various recognition modes such as fingerprints, human faces, irises, veins, voiceprints and poses, and the recognition process involves many techniques such as data collection, data processing, graphic image recognition, a comparison algorithm and software design. At present, various hardware and software products and industry application solutions based on the biometric feature recognition technology are widely applied in fields of finance, personal social security, public security, education and the like.

A certain risk exists in application of the biometric feature recognition. In two processes of biometric feature registration and identity authentication, a biometric feature recognition system is in a state of interacting with the outside, so at the moment, the system is vulnerable to attacks from the outside. In the identity authentication process of the biometric feature recognition system, security of the system is vulnerable to the following threats:
  a) forging features: an attacker provides forged biometric feature information in the process of identity authentication;
  b) replay attack: the attacker attacks information transfer between a biometric feature collection sub-system and a biometric feature matching sub-system, replays biometric feature information of a valid registered user and cheats on the matching sub-system for realizing a purpose of passing the identity authentication.

c) an attack of hacking into a database: the attacker hacks into a biometric feature template database of the system through hacking means, and tampers and forges registered biometric feature information to realize a purpose of passing the biometric feature information matching and identity authentication;

d) a transfer attack: the attacker attacks during data transfer from the biometric feature matching sub-system to the biometric feature template database, and the attacker can interrupt transferring the biometric feature information of the valid registered user on the one hand and can send the tampered and forged biometric feature information to the matching sub-system on the other hand for realizing the purpose of passing the identity authentication; and e) tampering a matcher: the attacker tampers a matching result by attacking the matcher for realizing the purpose of passing the identity authentication.

Examples of the disclosure provide a biometric feature verification method and apparatus, an electronic device and a storage medium.

Figure 3:
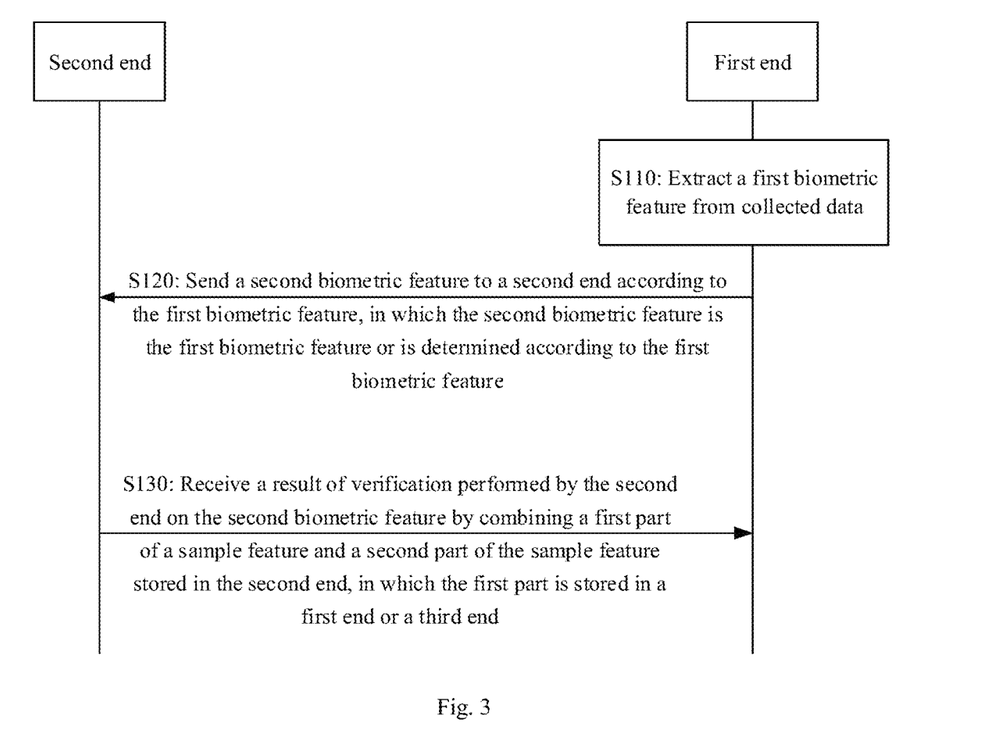
FIG. 3 is a schematic flowchart of a biometric feature verification method shown according to an example.

As shown in FIG. 3, an example of the disclosure provides a biometric feature verification method, applied to a first end and including:

S110: a first biometric feature is extracted from collected data;

S120: a second biometric feature is sent to a second end according to the first biometric feature, in which the second biometric feature is the first biometric feature or is determined according to the first biometric feature; and S130: a result of verification performed by the second end on the second biometric feature by combining a first part of a sample feature and a second part of the sample feature stored in the second end is received, in which the first part is stored in a first end or a third end.

The first end applying the biometric feature verification method may be a terminal or a server, the terminal includes but is not limited to: mobile terminals which a user can directly carry on, such as a mobile phone, a tablet computer or a wearable device, or may also be a vehicle terminal, or a public service facility in a public place, or the like.

The server may be various application servers or communication servers.

For example, the application server may be a server for providing an application service by an application provider. The communication server may be a server for providing a communication service by a communication operator.

In the example of the disclosure, the first end may be an end of requesting a verification, and an end which communicates with the first end and preforms verification of a biometric feature may be the second end.

In some examples, if the first end is a terminal, the second end may be a server side, and if the first end is a server side, the second end may be the terminal.

It is worth noting that the first end here may be the third end or may also not be the third end. For example, the user uses the mobile phone to collect a fingerprint feature, and the first part of the sample feature is stored in a personal computer (PC), so at the moment, the first end is the mobile phone of the user, and the third end may be the PC of the user. Here, the PC may send the first part of the sample feature to the second end based on a user command.

In some examples, the first end and the third end may be the same terminal, for example, may be the mobile phone or the tablet computer or other wearable devices of the user. In another example, the first end and the third end may be different devices, for example, the first end and the third end may be terminals with an established binding relation. In some other examples, the first end may be any terminal which collects the first biometric feature, and the third terminal may be an end bound to user information such as a user account of the user and the like.

In some examples, the first biometric feature here may include: various types of features which directly present biological tissue of body surface characteristics, muscles in the body, skeleton or skin, etc. of a living body, such as fingerprints, irises, vein features and/or face features.

In some other examples, the first biometric feature may depend on a part of user body but is not body's own features, such as a waving trajectory feature, a head-down feature or a head-up feature.

For another example, the first biometric feature may also include: after determining a height and an arm length of the user, when the user has a behavioral habit, the first biometric feature here may also include: a waving trajectory or a stride trajectory and the like.

For another example, once a weight and a physical attribute of the user are determined, a rhythm or a sound of the heart beating of the user is also regarded as a biometric feature.

In a word, various types of biometric features here can directly or indirectly reflect feature points of the living body of the user.

The collected data in the example of the disclosure may be data collected by various types of sensors, for example, fingerprint data collected by a fingerprint sensor and audio data collected by an audio collector, for another example, image data collected by an image sensor, and the like.

In short, these collected data may be for extracting the first biometric feature. The first end, after receiving the collected data from a sensor, may extract the first biometric feature in various feature extracting modes, for example, the first biometric feature and the like are extracted through a neural network and the like.

The first biometric feature, after being extracted, needs to be verified, for example, the first biometric feature extracted from the collected data, such as a face feature, an iris feature or a fingerprint feature, are sent to the second end to be verified.

After passing the verification, the first end may be sure that the current user is a valid user, so specific functions needing to be verified may be executed. For example, the specific functions include but are not limited to: a payment function, an entrance guard function, an information inquiry function, an information copy transfer function or an information modifying function.

In some examples, the second biometric feature may be the first biometric feature itself. In some other examples, in order to reduce a phenomenon of leakage of the first biometric feature, the first biometric feature may be further processed, such as encrypted, so the second biometric feature generated according to the first biometric feature is obtained.

In the example of the disclosure, the first end may also send, a part (here, being the first part for distinguishing) in a sample feature for matching stored in the first end, to the second end, the second end combines the part with the second part stored in the second end, and then a complete sample feature is obtained, so the first biometric feature is verified.

In the example of the disclosure, the sample feature is a feature of the valid user.

If the third end is the first end, the first end may also send the first part of the sample feature to the second end, at the moment, sending of the first part of the sample feature and sending of the second biometric feature have no certain precedence relationship. At the moment, the second biometric feature and the first part of the sample feature are sent to the second end together, or sent to the second end separately. In a word, the second end, when performing verification on the first biometric feature based on the second biometric feature, needs to receive the first part of the sample feature from the first end.

The sample feature is separately stored in the first end and the second end, so if an illegal user attempts to forge the biometric feature for a verification attack, not only a to-be-verified feature need to be forged, but also the first part of the sample feature needs to be forged, thus passing difficulty of feature forging is greatly improved, and the security is improved. In the meantime, if the illegal user attacks a feature data base storing the sample feature and attempts to pass the verification by tampering the sample feature, but now, the first part of the sample feature is stored in the first end, the second part is stored in the second end, apparently, to successfully tamper the sample feature needs to attack at least the first end and the second end, and thus the difficulty of the feature attack of hacking into a database is improved.

To sum up, in the example of the disclosure, the mode that the first part and the second part of the sample feature are stored in the first end and the second end respectively improves the security of the biometric feature verification.

In some examples, the second biometric feature is carried in a verification request to be sent to the second end. The verification request may also carry user information, for example, a user account and the like. The user information indicates a user to be subjected to biometric feature verification. For another example, the user information may also be a user identity. The user account includes an application account, a payment account, a phone number and/or a social media account. The user identity may include: an identity card number and/or a passport number and the like.

In some examples, the first part and the second part contain different feature parts of the same biometric feature of the valid user.

In some examples, the sample feature includes: N features, the first part may contain n1, the second part contains n2, and a sum of n1 and n2 is greater than or equal to N. N, n1 and n2 are all positive integers.

The sample feature includes: N features, and each feature includes M eigenvalues. For example, the first part may include: P1*Si1 eigenvalues; the second part may include: P2*Si2 features; a sum of Si1 and Si2 here is greater than or equal to M; and P1 and P2 are greater than or equal to N. A value of i may be a positive integer, and if values of i are different, values of Si1 and Si2 are different. For example, hypothetically, M=4, when i is equal to 1, Si1=1, so Si2=3; and when i=2, Si1=2, Si2=2. Certainly, in an example, Si1 may be equal to Si2 all the time.

For example, the sample feature is written in a feature matrix, values obtained through a dot product operation with a partition matrix constitute the second part, and the rest of parts in the feature matrix naturally becomes the first part. Or, the sample feature is written in the feature matrix, and values obtained through the dot product operation with the partition matrix constitute the first part. The rest of parts in the feature matrix naturally becomes the second part.

The feature matrix here may be a two-dimensional matrix or a three-dimensional matrix. The partition matrix may be a matrix in the same dimension as the feature matrix, and the partition matrix may include: a "0" element and a nonzero element. Hypothetically, the feature matrix is the two-dimensional matrix, so the partition matrix is the two-dimensional matrix as well, for example, the partition matrix may be a triangular matrix, a diagonal matrix or a unit matrix or the like. Certainly, the partition matrix is described here merely by taking an example and is not limited to this example during specific implementation.

It is worth noting that the complete sample feature can be spliced after combining the first part and the second part.

In some examples, the first part and the second part are different parts in a sample matrix and may be completely spliced into the sample feature just right, that is, there is no overlapping or redundancy between features or eigenvalues contained in the first part and the second part.

Accordingly, in a process of the first part and the second part, first, whether the first part and the second part can be completely combined into the sample feature is verified, and if not, the second end may perform verification not based on the second biometric feature. If the sample feature can be completely formed by combining, the second end performs verification based on the second biometric feature, in this way, a needless biometric feature verification can be omitted, and an attack on the biometric feature verification is further inhibited or eliminated.

In some examples, the first part and the second part include: different feature parts of the same biometric feature of the valid user, and the same parts of the same biometric feature of the valid user. If the first part and the second part have different parts, they also contain the same parts at the same time.

S120 may include:

the result of the verification performed by the second end on the second biometric feature by combining the first part and the second part in response to determining that the same parts in the first part and the second part match successfully is received.

The second end, after receiving the first part, determines an overlapping part between the first part and the second part in the sample feature according to a partitioning algorithm of the sample feature, and then selects out the overlapping part for matching. Verification is performed on the second biometric feature based on the first part and the second part merely when the overlapping part between the first part and the second part is the same. For example, under the condition of successful matching of the selected-out overlapping part, the first part and the second part are combined to form the sample feature, and then the combined sample feature matches with the second biometric feature, so the result of the verification is obtained.

In this way, a combining process of the sample feature is equivalent to performing a verification, a risk in the verification process of the biometric feature is further reduced, and the security of the biometric feature is improved.

Figure 4:
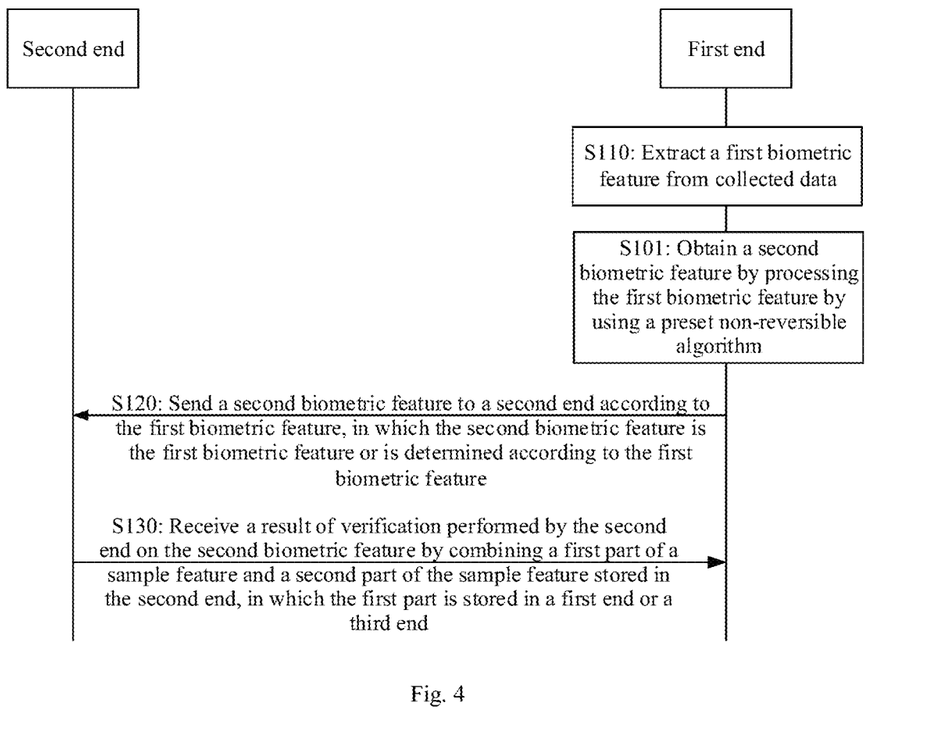
FIG. 4 is a schematic flowchart of a biometric feature verification method shown according to an example.

In some examples, as shown in FIG. 4, the method further includes:

S101: the first biometric feature is processed by using a preset non-reversible algorithm to obtain the second biometric feature, in which the first part of the sample feature and the second part of the sample feature are: different parts obtained after processing original biometric features of the valid user by using the preset non-reversible algorithm.

In the example of the disclosure, in order to further improve the security of the biometric feature verification, the first biometric feature is not directly sent, but the first biometric feature is processed by using the preset non-reversible algorithm, so the first biometric feature is transformed into a second biometric feature which cannot be reduced into the first biometric feature, and then the second biometric feature is sent to the second end. At the moment, the sample feature is also obtained after processing the original biometric feature by using the preset non-reversible algorithm, and the first part and the second part are obtained by partitioning after processing the original biometric feature by using the preset non-reversible algorithm.

The preset non-reversible algorithm here may include: a non-reversible encryption algorithm. For example, the non-reversible encryption algorithm includes but is not limited to a message-digest algorithm (MDA) 5.

If it is the preset non-reversible encryption algorithm, the second biometric feature is an encrypted feature obtained after encrypting the first biometric feature.

In some other examples, the preset non-reversible algorithm may also include: a non-reversible feature interference algorithm. The non-reversible feature interference algorithm here contains but is not limited to: a redundant feature addition algorithm, a feature missing algorithm and/or a feature replacement algorithm.

Through the redundant feature addition algorithm, redundant information is added into the first biometric feature, so as to obtain the second biometric feature which cannot be reduced into the first biometric feature.

Through the feature missing algorithm, a part of features or eigenvalues of a part of features are taken out of the first biometric feature, so the first biometric feature is incomplete, and cannot be or is hardly reduced into the first biometric feature.

In yet some other examples, through the feature replacement algorithm, a part of features or a part of eigenvalues of a part of features in the first biometric feature are replaced, and the second biometric feature obtained after replacement is hardly reduced into the first biometric feature.

In a word, in order to further improve the security of the first biometric feature, the first biometric feature is not directly sent to the first end, but the second biometric feature after processing through the preset non-reversible algorithm is sent, in this way, a probability of tampering or attacking during transfer of the biometric feature is lowered, and the security of the biometric feature is improved again.

In some examples, S101 may include:
the redundant information is added into the first biometric feature by using the preset non-reversible algorithm, so the second biometric feature with the added redundant information and incapable of being reduced into the first biometric feature is obtained.

In some examples, S101 further includes:
the first biometric feature is encrypted by using the preset non-reversible encryption algorithm, and the second biometric feature which cannot be reduced into the first biometric feature is obtained through transformation.

In some examples, S101 further includes:
through the preset non-reversible algorithm, a part of feature points of the first biometric feature are removed, the eigenvalue of the first biometric feature is modified, and/or a part of eigenvalues in a part of or all of feature points of the first biometric feature are removed, and then the second biometric feature which cannot be reduced into the first biometric feature is obtained.

The above description is merely an example for transforming the first biometric feature into the second biometric feature which cannot be reduced into the first biometric feature, and specific implementation is not limited to the above example.

In some examples, the first end, when sending the second biometric feature to the second end, may actively send the first part to the second end, in this way, the first part is actively pushed to the second end under the condition of no specific instruction from the second end.

Figure 5:
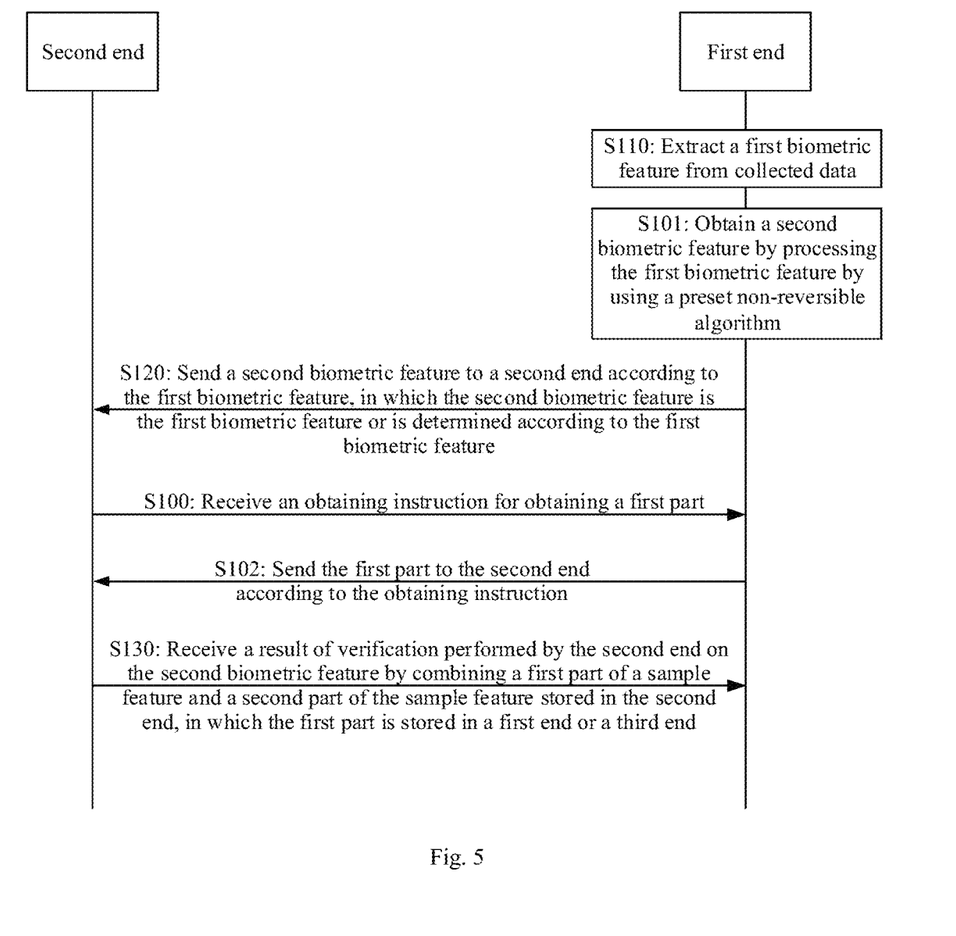
FIG. 5 is a schematic flowchart of a biometric feature verification method shown according to an example.

In some other examples, if the third end is the first end, refer to FIG. 5, the method further includes:
S100: an obtaining instruction for obtaining the first part is received; and
S102: the first part is sent to the second end according to the obtaining instruction.

For example, the second end, after receiving the second biometric feature, determines that a biometric feature verification demand is generated, and then sends the obtaining instruction to the corresponding first end, and the corresponding first end, after receiving an obtaining request, returns the first part to the second end. At the moment, the first end reporting the second biometric feature and the first end reporting the first part may be the same or not the same.

In a scenario, the biometric feature verification needs to be performed when the valid user executes the payment function in a place A, an electronic device that the valid user wear or hand-hold or a dealer's device collects data of the user in the place A, extracts the first biometric feature and reports, to the second end, the second biometric feature based on the first biometric feature. Afterwards, the second end sends the obtaining instruction to the first end bound to the user account of the valid user, for example, the first end bound to the user account of the valid user may be located in a place B, the first end in the place B receives the obtaining instruction, and the first end sends the first part to the second part. The place A and the place B may be any two different locations, for example, two provinces, two countries or two continents.

Figure 6:
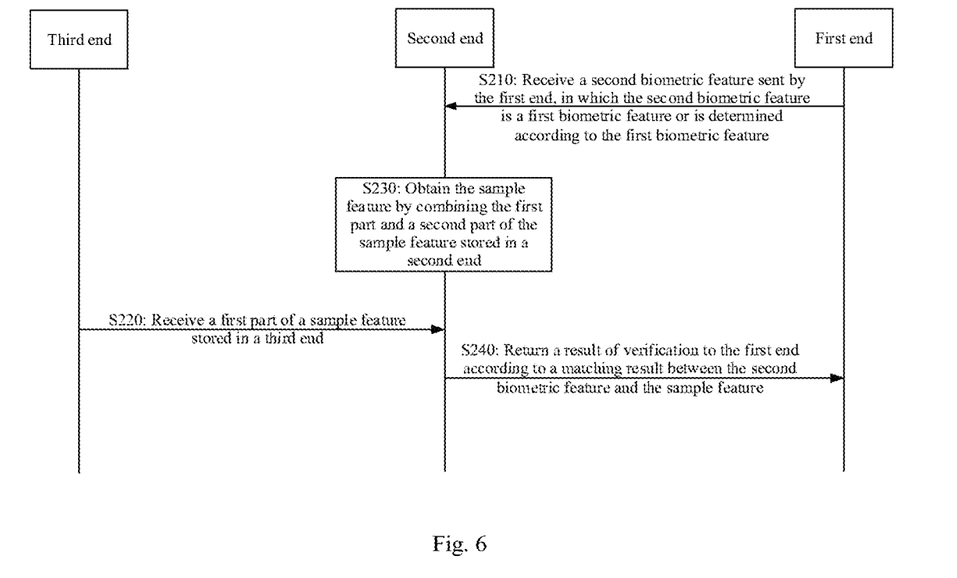
FIG. 6 is a schematic flowchart of a biometric feature verification method shown according to an example.

As shown in FIG. 6, an example of the disclosure provides a biometric feature verification method, including:
S210: a second biometric feature sent by a first end is received, in which the second biometric feature is a first biometric feature or is determined according to the first biometric feature;
S220: a first part of a sample feature stored in a third end is received;
S230: the sample feature is obtained by combining the first part and the second part of the sample feature stored in the second end; and
S240: a result of verification is returned to the first end according to a matching result between the second biometric feature and the sample feature.

The method provided by the example is applied to the second end, and the second end may be an end for performing a remote verification on the first biometric feature.

The second end may be a server or a terminal or the like.

In the example of the disclosure, the second end stores merely the second part of the sample feature, the second part is not the complete sample feature, the first part needs to be received, the second part is combined with the first part, so the complete sample feature can be obtained, and thus verification is performed on the first biometric feature based on the second biometric feature.

In some examples, the second biometric feature sent by the first end is received, and after the second biometric feature is received, the verification can be performed by obtaining the first part. The first part here may be stored in the same terminal together with the second biometric feature, so the second biometric feature may be sent to the second end together with the first part, or may also be sent separated from the first part. In other words, the first part and the second biometric feature may be received synchronously, or may also be received separately.

The third end may be the first end, or may also be an electronic device independent of (separated from) the second end besides the first end.

In some examples, the first part and the second part contain different feature parts of the same biometric feature of the valid user.

The first part and the second part are different parts of the same biometric feature belonging to the valid user, so they are conveniently combined subsequently to obtain the sample feature. The sample feature is a biometric feature of the valid user.

In some examples, the method further includes:
the first part and the second part are combined; and
whether combination of the first part and the second part meets a demand of the sample feature for a format or a form is determined, if the demand of the sample feature for the format or the form is not met, it is regarded as failure in verification, and biometric feature verification based on the second biometric feature is directly not preformed any more.

In some other examples, if combination of the first part and the second part meets the demand for the format or the form, the first biometric feature is verified based on the second biometric feature and the sample feature obtained through combination, and then the result of the verification is obtained.

In this way, during the biometric feature verification, combination verification of the sample feature is performed first, and it is equivalent to double verifications for the biometric feature verification, which ensures the security of the verification.

In some examples, the first part and the second part include: different feature parts of the same biometric feature of the valid user and the same parts of the same biometric feature of the valid user.

Obtaining the sample feature by combining the first part and the second part of the sample feature stored in the second end includes:
the same parts in the first part and the second part match; and
the first part and the second part are combined in response to determining that the same parts in the first part and the second part match successfully, and the sample feature is obtained.

For accurate matching verification, the first part and the second part may partially include overlapping parts. For example, the same parts in the first part and the second part match, the verification of the first biometric feature is performed based on the second biometric feature merely when matching is consistent, so as to ensure the security.

In some examples, the method further includes:
if the sample feature is obtained after processing through the preset non-reversible algorithm and the received second biometric feature is the first biometric feature itself, the first biometric feature is processed by using the preset non-reversible algorithm, and a third biometric feature after processing is obtained; and
the third biometric feature and the sample feature formed through combination match, so as to obtain the result of the verification.

That is, the second biometric feature received by the second end from the first end is the first biometric feature itself, so the first biometric feature is processed by using the preset non-reversible algorithm, and the third biometric feature is obtained.

Obtaining the third biometric feature by processing the first biometric feature by using the preset non-reversible algorithm includes:
redundant information is added into the first biometric feature by using the preset non-reversible algorithm, so as to obtain the third biometric feature with the added redundant information and incapable of being reduced into the first biometric feature.

In some examples, obtaining the third biometric feature by processing the first biometric feature by using the preset non-reversible algorithm further includes:
the first biometric feature is encrypted by using the preset non-reversible encryption algorithm, and the third biometric feature which cannot be reduced into the first biometric feature is obtained through transformation.

In yet some other examples, obtaining the third biometric feature by processing the first biometric feature by using the preset non-reversible algorithm further includes:
through the preset non-reversible algorithm, a part of feature points of the first biometric feature are removed, an eigenvalue of the first biometric feature is modified, and/or a part of eigenvalues in a part of or all of feature points of the first biometric feature are removed, and then the third biometric feature which cannot be reduced into the first biometric feature is obtained.

In some examples, the method further includes:
after the second biometric feature is received, an obtaining request is sent to the first end, in which the obtaining request is used for obtaining the first part from the first end.

The first part may be requested from the third end through sending of the obtaining request. In some other examples, the first part may be actively pushed by the third end.

For example, the second biometric feature and the user information are jointly carried in a verification request to be sent to the second end, and the second end, after receiving the second biometric feature, sends the obtaining request to the third end according to the user information, in which the obtaining request carries the user information. The third end receives the obtaining request carrying the user information, retrieves the first part of the sample feature stored in the local of the third end and corresponding to the user information according to the user information and sends the first part to the second end.

Figure 7:
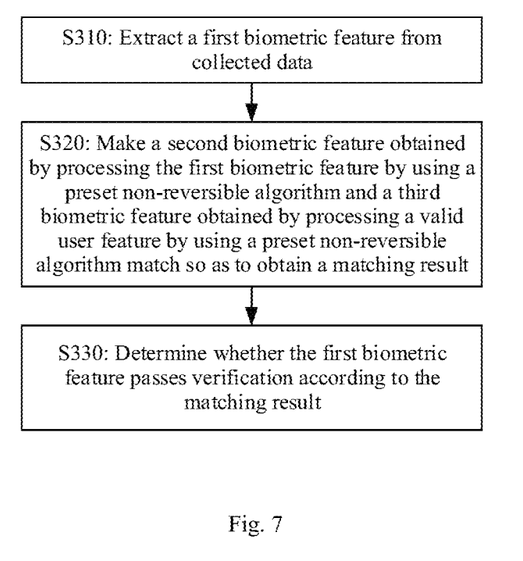
FIG. 7 is a schematic flowchart of a biometric feature verification method shown according to an example.

As shown in FIG. 7, an example of the disclosure provides a biometric feature verification method, including:
S310: a first biometric feature is extracted from collected data;
S320: the second biometric feature obtained by processing the first biometric feature by using the preset non-reversible algorithm and the third biometric feature obtained by processing a valid user feature by using the preset non-reversible algorithm match, so as to obtain a matching result; and
S330: whether the first biometric feature passes verification is determined according to the matching result.

The example of the disclosure may be applied to a terminal or a server. The terminal here may be various types of terminals, for example, a mobile phone, a tablet computer or a wearable device and the like commonly used by a user, or may also be a vehicle terminal or an Internet of Things terminal or the like.

In some examples, S320 includes:
redundant information is added into the first biometric feature by using the preset non-reversible algorithm, and the second biometric feature with the added redundant information and incapable of being reduced into the first biometric feature is obtained.

In some examples, S320 further includes:
the first biometric feature is encrypted by using the preset non-reversible encryption algorithm, and the second biometric feature which cannot be reduced into the first biometric feature is obtained through transformation.

In some examples, S320 further includes:
through the preset non-reversible algorithm, a part of feature points of the first biometric feature are removed, an eigenvalue of the first biometric feature is modified, and/or a part of eigenvalues in a part of or all of feature points of the first biometric feature are removed, and the second biometric feature which cannot be reduced into the first biometric feature is obtained.

Figure 8:
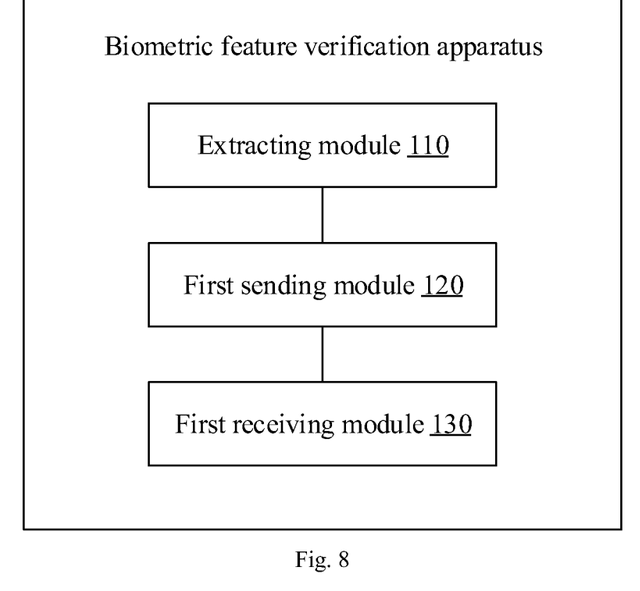
FIG. 8 is a schematic structural diagram of a biometric feature verification apparatus shown according to an example.

As shown in FIG. 8, an example of the disclosure provides a biometric feature verification apparatus, including:
an extracting module 110, configured to extract a first biometric feature from collected data;
a first sending module 120, configured to send a second biometric feature to a second end according to the first biometric feature, in which the second biometric feature is the first biometric feature or is determined according to the first biometric feature; and
a first receiving module 130, configured to receive a result of verification performed by the second end on the second biometric feature by combining the first part of the sample feature and the second part of the sample feature stored in the second end, in which the first part is stored in a first end or a third end.

In some examples, the extracting module 110, the first sending module 120 and the first receiving module 130 may be program modules, and the program modules, after being executed by a processor, can implement the above biometric feature verification method.

In some other examples, the extracting module 110, the first sending module 120 and the first receiving module 130 may be software and hardware combined modules, the software and hardware combined modules may include various programmable arrays, and the programmable arrays include but are not limited to a complex programmable array or a field programmable array.

In yet some other examples, the extracting module 110, the first sending module 120 and the first receiving module 130 may be hardware-only modules, and the hardware-only modules include but are not limited to: an application-specific integrated circuit.

In some examples, the first part and the second part contain different feature parts of the same biometric feature of a valid user.

In some examples, the first part and the second part include: different feature parts of the same biometric feature of the valid user and the same parts of the same biometric feature of the valid user.

The first receiving module 130 is configured to receive the result of the verification performed by the second end on the second biometric feature by combining the first part and the second part in response to determining that the same parts in the first part and the second part match successfully.

In some examples, the apparatus further includes:
a processing module, configured to process the first biometric feature by using the preset non-reversible algorithm so as to obtain the second biometric feature, in which the first part of the sample feature and the second part of the sample feature are: different parts obtained after processing an original biometric feature of the valid user by using the preset non-reversible algorithm.

In some examples, the processing module is configured to add redundant information into the first biometric feature by using the preset non-reversible algorithm so as to obtain the second biometric feature with the added redundant information and incapable of being reduced into the first biometric feature.

In some examples, the processing module is configured to encrypt the first biometric feature by using the preset non-reversible encryption algorithm so as to obtain, through transformation, the second biometric feature which cannot be reduced into the first biometric feature.

In some examples, the processing module is configured to, through the preset non-reversible algorithm, remove a part of feature points of the first biometric feature, modify an eigenvalue of the first biometric feature, and/or remove a part of eigenvalues in a part of or all of feature points of the first biometric feature, so as to obtain the second biometric feature which cannot be reduced into the first biometric feature.

In some examples, the third end is the first end, and the first sending module 120 is further configured to receive an obtaining instruction for obtaining the first part.

The first sending module 120 is further configured to send the first part to the second end according to the obtaining instruction.

Figure 9:
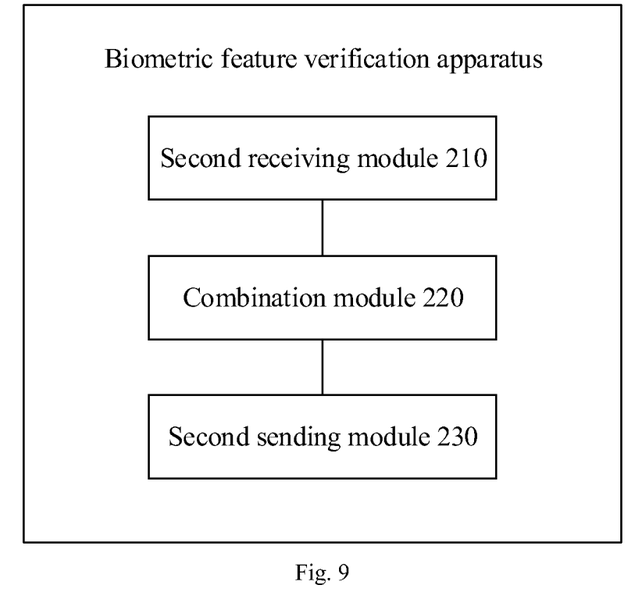
FIG. 9 is a schematic structural diagram of a biometric feature verification apparatus shown according to an example.

As shown in FIG. 9, an example of the disclosure provides a biometric feature verification apparatus, including:
a second receiving module 210, configured to receive a second biometric feature sent by a first end, in which the second biometric feature is a first biometric feature or is determined according to the first biometric feature; and further configured to receive a first part of a sample feature stored in a third end;
a combination module 220, configured to obtain the sample feature by combining the first part and the second part of the sample feature stored in the second end; and
a second sending module 230, configured to return a result of verification to the first end according to a matching result between the second biometric feature and the sample feature.

In some examples, the second receiving module 210, the combination module 220 and the second sending module 230 may be program modules, and the program modules, after being executed by a processor, can implement the above biometric feature verification method.

In some other examples, the second receiving module 210, the combination module 220 and the second sending module 230 may be software and hardware combined modules, and the software and hardware combined modules include but are not limited to a programmable array.

In yet some other examples, the second receiving module 210, the combination module 220 and the second sending module 230 may be hardware-only modules, and the hardware-only modules include but are not limited to an application-specific integrated circuit.

In some examples, the first part and the second part contain different feature parts of the same biometric feature of a valid user.

In some examples, the first part and the second part include: different feature parts of the same biometric feature of the valid user and the same parts of the same biometric feature of the valid user.

The combination module 220 is configured to make the same parts in the first part and the second part match, and combine the first part and the second part in response to determining that the same parts in the first part and the second part match successfully, so as to obtain the sample feature.

In some examples, the second receiving module 210 is further configured to send an obtaining request to the third end after receiving the second biometric feature, in which the obtaining request is used for obtaining the first part from the first end.

Several specific examples are provided below with reference to any one of above examples.

Example 1

An example of the disclosure makes description of the method by taking a human face as an example, based on the same principle, the provided method may also be applied to other biometric feature modes, such as fingerprints and irises. A face recognition method provided by the example of the disclosure is as follows: when a face sample is stored in the local or a server side, a non-reversible algorithm is adopted in a feature extracting link, an extracted face feature is compared with a sample feature stored in a face registration process, and then a recognition result is determined. A non-reversible algorithm used in the face registration process and a non-reversible algorithm used in a recognition process can guarantee that as for the same face image, a similarity of the extracted face feature is higher than a pre-defined threshold.

The non-reversible algorithm includes adding redundant information into the extracted face feature or removing some feature points from the extracted face feature. Thus, the stored face feature cannot be recovered to a face image.

For example, the collected data take an image as an example, and a biometric feature verification method provided by the example may include:

original biometric features are extracted from the image first;
these biometric features are processed by using the non-reversible algorithm, for example, adding redundant information, removing feature points or performing non-reversible encryption, so as to obtain a stored biometric feature;
non-reversible algorithm operation of the biometric feature is performed on the collected image in the same mode during application so as to obtain a result; and
the obtained result and the stored biometric feature (namely, the sample feature) match for authentication (namely, verification).

Example 2

When a face sample feature is stored in the local and a server side, in this case, when a face recognition operation needs to be executed, a collecting end will notify a user of executing the face recognition operation, under the condition that the user is certain of executing, a face sample in the local will be sent to the server side, recognition is executed on the server side, and the server side returns a recognition result.

For example, the sample feature is stored in the local and the server side. The server side does not store a complete sample feature. If recognition is to be performed, a terminal needs to send a sample feature stored in a safe area to the server side, then the server side receives the sample feature of the terminal and combines it with the sample feature stored in the server side, so as to obtain the complete sample feature, and then recognition of the face feature to be verified is performed.

An example of the disclosure provides a communication device, including a processor, a transceiver, a memory and an executable program stored on the memory and capable of being run by the processor, in which the processor, when running the executable program, executes a control channel detection method applied to UE and provided by any one of above technical solutions, or executes an information processing method applied to a base station and provided by any one of above technical solutions.

The communication device may be the above base station or UE.

The processor may include various types of storage media, the storage media are a non-transitory computer storage medium, which can continue memorizing information stored after the communication device has a power failure. Here, the communication device includes a base station or user equipment.

The processor may be connected with the memory through a bus and the like and is configured to read the executable program stored on the memory, for example, at least one in FIG. 3 to FIG. 7.

An example of the disclosure provides a non-transitory computer storage medium. The non-transitory computer storage medium stores an executable program. The executable program, when executed by a processor, can implement the method shown by any technical solution of the first aspect or the second aspect, for example, at least one in FIG. 3 to FIG. 7.

Figure 10:
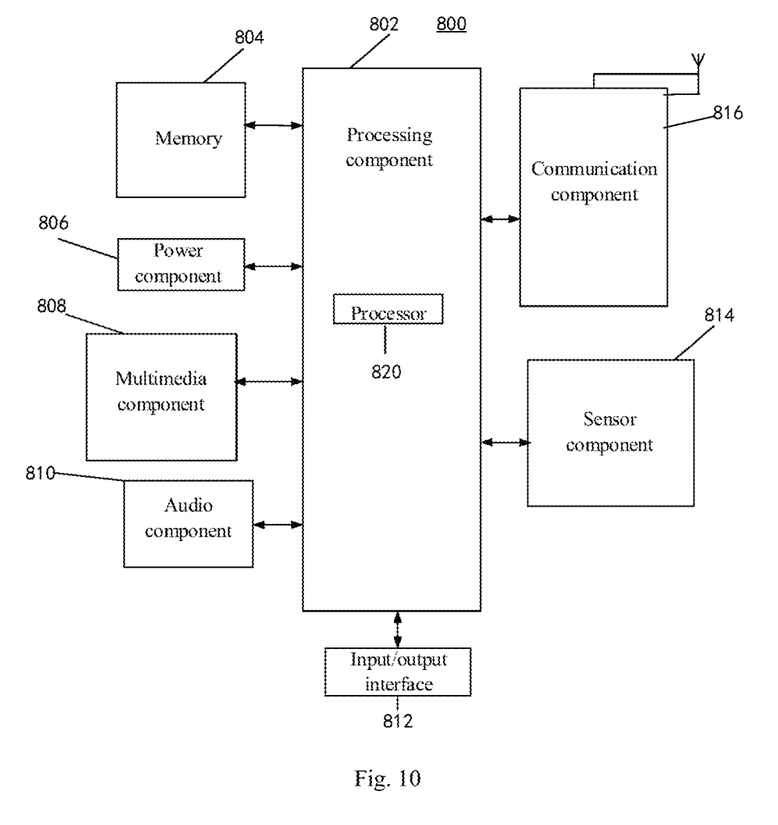
FIG. 10 is a schematic structural diagram of UE shown according to an example.

FIG. 10 is a block diagram of UE 800 shown according to an example. For example, the UE 800 may be a mobile phone, a computer, digital broadcast user equipment, a messaging device, a game console, a tablet device, a medical device, a fitness facility, a personal digital assistant and the like.

Referring to FIG. 10, the UE 800 may include at least one component as follows: a processing component 802, a memory 804, a power component 806, a multimedia component 808, an audio component 810, an input/output (I/O) interface 812, a sensor component 814 and a communication component 816.

The processing component 802 generally controls whole operation of the UE 800, such as operations related to display, phone call, data communication, camera operation and recording operation. The processing component 802 may include at least one processor 820 for executing instructions so as to complete all or part of steps of the above method. Besides, the processing component 802 may include at least one module to facilitate interaction between the processing component 802 and the other components. For example, the processing component 802 may include a multimedia module so as to facilitate interaction between the multimedia component 808 and the processing component 802.

The memory 804 is configured to store various types of data so as to support operations on the UE 800. Examples of these data include instructions of any application program or method for operation on the UE 800, contact person data, telephone directory data, messages, pictures, videos and the like. The memory 804 may be implemented by any type of volatile or non-volatile storage device or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or a compact disc.

The power component 806 provides power for various components of the UE 800. The power component 806 may include a power management system, at least one power source, and other components related to power generation, management and distribution for the UE 800.

The multimedia component 808 includes a screen which provides an output interface between the UE 800 and a user. In some examples, the screen may include a liquid crystal display (LCD) and a touch panel (TP). If the screen includes the touch panel, the screen may be implemented as a touch screen so as to receive an input signal from the user. The touch panel includes at least one touch sensor so as to sense touching, swiping and gestures on the touch panel. The touch sensor can not only sense a boundary of a touching or swiping action, but also detect wake-up time and pressure related to touching or swiping operation. In some examples, the multimedia component 808 includes a front camera and/or a back camera. When the UE 800 is in an operation mode, such as a photographing mode or a video mode, the front camera and/or the back camera can receive external multimedia data. Each front camera and each back camera may be a fixed optical lens system or have a focal length and an optical zoom capability.

The audio component 810 is configured to output and/or input an audio signal. For example, the audio component 810 includes a microphone (MIC). When the UE 800 is in the operation mode, such as a call mode, a recording mode and a voice recognition mode, the microphone is configured to receive an external audio signal. The received audio signal may be further stored in the memory 804 or sent via the communication component 816. In some examples, the audio component 810 further includes a speaker for outputting the audio signal.

The I/O interface 812 provides an interface between the processing component 802 and a peripheral interface module, and the above peripheral interface module may be a keyboard, a click wheel, buttons and the like. These buttons may include but are not limited to: a home button, a volume button, a start button and a lock button.

The sensor component 814 includes at least one sensor, configured to provide state evaluation of various aspects for the UE 800. For example, the sensor component 814 may detect a start/shut-down state of the UE 800 and relative positioning of the components, for example, the components are a display and a keypad of the UE 800. The sensor component 814 may further detect location change of the UE 800 or one component of the UE 800, whether there is contact between the user and the UE 800, azimuth or speed up/speed down of the UE 800 and temperature change of the UE 800. The sensor component 814 may include a proximity sensor, configured to detect existence of a nearby object without any physical contact. The sensor component 814 may further include an optical sensor, such as a CMOS or CCD image sensor, for use in imaging application. In some examples, the sensor component 814 may further include an acceleration sensor, a gyroscope sensor, a magnetic sensor, a pressure sensor or a temperature sensor.

The communication component 816 is configured to facilitate wired or wireless communication between the UE 800 and other devices. The UE 800 may be accessed to a wireless network based on a communication standard, such as WiFi, 2G or 3G, or their combination. In an example, the communication component 816 receives a broadcast signal or related broadcast information from an external broadcast management system via a broadcast channel. In an example, the communication component 816 further includes a near-field communication (NFC) module so as to facilitate short-range communication. For example, the NFC module may be implemented based on a radio frequency identification (RFID) technology, an infra-red data association (IrDA) technology, an ultra wide band (UWB) technology, a Bluetooth (BT) technology and other technologies.

In an example, the UE 800 may be implemented by at least one application specific integrated circuit (ASIC), digital signal processor (DSP), digital signal processing device (DSPD), programmable logic device (PLD), field-programmable gate array (FPGA), controller, microcontroller, microprocessor or other electronic elements for executing the above method.

In an example, a non-transitory computer-readable storage medium including instructions is further provided, such as a memory 804 including the instructions. The above instructions may be executed by a processor 820 of UE 800 so as to complete the above method. For example, the non-transitory computer-readable storage medium may be an ROM, a random access memory (RAM), a CD-ROM, a magnetic tape, a floppy disk, an optical data storage device and the like.

Figure 11:
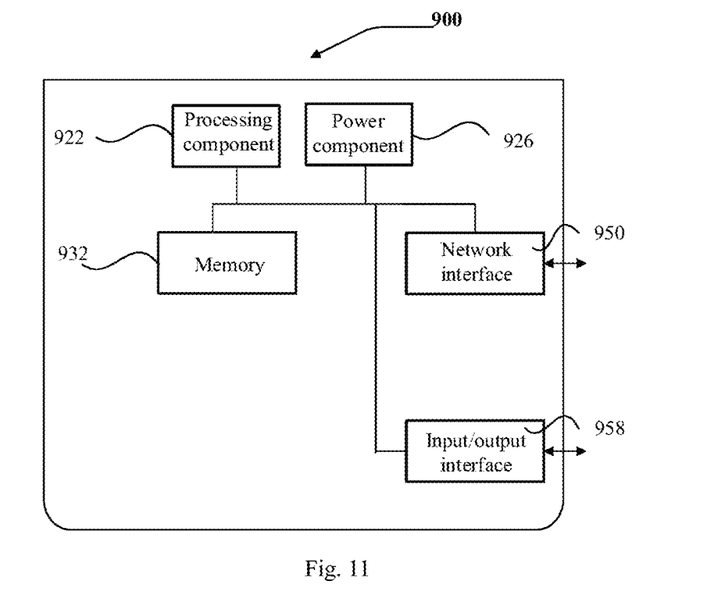
FIG. 11 is a schematic structural diagram of a base station shown according to an example.

As shown in FIG. 11, an example of the disclosure shows a structure of a base station. For example, the base station 900 may be provided as a network device. Referring to FIG. 11, the base station 900 includes a processing component 922 which further includes at least one processor and a memory resource represented by a memory 932, configured to store an instruction capable of being executed by the processing component 922, for example, an application program. The application program stored in the memory 932 may include one or more than one module each of which corresponds to a set of instructions. Besides, the processing component 922 is configured to execute instructions so as to execute any one of the above methods applied to the base station, for example, the methods shown in FIG. 3 to FIG. 7.

The base station 900 may also include a power component 926 configured to execute power management of the base station 900, a wired or wireless network interface 950 configured to connect the base station 900 to a network, and an input/output (I/O) interface 958. The base station 900 can operate an operating system stored in the memory 932, for example, Windows Server™, Mac OS X™, Unix™, Linux™, FreeBSD™, or the like.

Those skilled in the art will easily figure out other implementation solutions of the disclosure after considering the specification and practicing the disclosure disclosed here. The disclosure intends to cover any transformation, application or adaptive change of the disclosure which conforms to a general principle of the disclosure and includes common general knowledge or conventional technical means which are not disclosed by the disclosure in the technical field. The specification and the examples are merely regarded as examples, and the true scope and spirit of the disclosure are indicated by the following claims.

It should be understood that the disclosure is not limited to an accurate structure described above and shown in the accompanying drawings, and various modifications and changes can be made without departing from its scope. The scope of the disclosure is limited merely by appended claims.

What is claimed is:

1. A biometric feature verification method, comprising:
   extracting a first biometric feature from collected data;

obtaining a second biometric feature by processing the first biometric feature by using a preset non-reversible algorithm;

sending the second biometric feature to a second end according to the first biometric feature; and receiving a result of verification performed by the second end on the second biometric feature by combining a first part of a sample feature and a second part of the sample feature stored in the second end, wherein the first part is stored in a first end or a third end, wherein the first part of the sample feature and the second part of the sample feature are: different parts obtained after processing an original biometric feature of a valid user through the preset non-reversible algorithm;

wherein obtaining the second biometric feature by processing the first biometric feature by using the preset non-reversible algorithm comprises:

obtaining the second biometric feature that is not reduced into the first biometric feature by at least one of:

removing a part of feature points of the first biometric feature, modifying an eigenvalue of the first biometric feature, and removing a part of eigenvalues in a part of or all of feature points of the first biometric feature by using a preset non-reversible algorithm.

2. The biometric feature verification method according to claim 1, wherein the first part and the second part contain different feature parts of a same biometric feature of a valid user.

3. The biometric feature verification method according to claim 1, wherein the first part and the second part comprise:

different feature parts of a same biometric feature of a valid user and same parts of the same biometric feature of the valid user; and receiving the result of the verification performed by the second end on the second biometric feature by combining the first part of the sample feature and the second part of the sample feature stored in the second end comprises:

receiving the result of the verification performed by the second end on the second biometric feature by combining the first part and the second part in response to determining that the same parts in the first part and the second part match.

4. The biometric feature verification method according to claim 1, wherein the third end is the first end, and the biometric feature verification method further comprises:

receiving an obtaining instruction for obtaining the first part; and sending the first part to the second end according to the obtaining instruction.

5. A biometric feature verification method, comprising:

receiving a second biometric feature sent by a first end, wherein the second biometric feature is obtained by processing a first biometric feature by using a preset non-reversible algorithm;

receiving a first part of a sample feature stored in a third end;

obtaining the sample feature by combining the first part and a second part of the sample feature stored in a second end, wherein the first part of the sample feature and the second part of the sample feature are: different parts obtained after processing an original biometric feature of a valid user through the preset non-reversible algorithm; and returning a result of verification to the first end according to a matching result between the second biometric feature and the sample feature, wherein the second biometric feature that is not reduced into the first biometric feature is obtained by at least one of:

removing a part of feature points of the first biometric feature, modifying an eigenvalue of the first biometric feature, and removing a part of eigenvalues in a part of or all of feature points of the first biometric feature by using a preset non-reversible algorithm.

6. The biometric feature verification method according to claim 5, wherein the first part and the second part comprise different feature parts of a same biometric feature of a valid user.

7. The biometric feature verification method according to claim 5, wherein the first part and the second part comprise: different feature parts of a same biometric feature of a valid user and same parts of the same biometric feature of the valid user; and obtaining the sample feature by combining the first part and the second part of the sample feature stored in the second end comprises:

making the same parts in the first part and the second part match; and obtaining the sample feature by combining the first part and the second part in response to determining that the same parts in the first part and the second part match successfully.

8. The biometric feature verification method according to claim 5, further comprising:

sending an obtaining request to the third end after receiving the second biometric feature, wherein the obtaining request is used for obtaining the first part from the first end.

9. A communication device, comprising a processor, a transceiver, a memory and an executable program stored on the memory and capable of being run by the processor, wherein the processor, when running the executable program, executes instructions to:

extract a first biometric feature from collected data;

obtain a second biometric feature by processing the first biometric feature by using a preset non-reversible algorithm;

send the second biometric feature to a second end according to the first biometric feature; and receive a result of verification performed by the second end on the second biometric feature by combining a first part of a sample feature and a second part of the sample feature stored in the second end, wherein the first part is stored in a first end or a third end, wherein the first part of the sample feature and the second part of the sample feature are: different parts obtained after processing an original biometric feature of a valid user through the preset non-reversible algorithm, wherein the processor further executes instructions to:

obtain the second biometric feature that is not reduced into the first biometric feature by at least one of:

removing a part of feature points of the first biometric feature, modifying an eigenvalue of the first biometric feature, and removing a part of eigenvalues in a part of or all of feature points of the first biometric feature by using a preset non-reversible algorithm.

10. The communication device according to claim 9, wherein the first part and the second part contain different feature parts of a same biometric feature of a valid user.

11. The communication device according to claim 9, wherein the first part and the second part comprise different feature parts of a same biometric feature of a valid user and the same parts of the same biometric feature of the valid user; and the processor, when running the executable program, executes instructions to receive the result of the verification performed by the second end on the second biometric feature by combining the first part and the second part in response to determining that the same parts in the first part and the second part match.

12. A non-transitory computer storage medium, wherein the non-transitory computer storage medium stores an executable program, and the executable program, after being executed by a processor, implements the biometric feature verification method provided according to claim 1.

13. A communication device, comprising a processor, a transceiver, a memory and an executable program stored on the memory and capable of being run by the processor, wherein the processor, when running the executable program, executes the biometric feature verification method provided according to claim 5.

14. A non-transitory computer storage medium, wherein the non-transitory computer storage medium stores an executable program, and the executable program, after being executed by a processor, can implements the biometric feature verification method provided according to claim 5.

* * * * *

UNITED STATES PATENT AND TRADEMARK OFFICE
CERTIFICATE OF CORRECTION

PATENT NO. : 12,425,396 B2
APPLICATION NO. : 17/928917
DATED : September 23, 2025
INVENTOR(S) : Yajun Zhu et al.

Page 1 of 1

It is certified that error appears in the above-identified patent and that said Letters Patent is hereby corrected as shown below:

In the Specification

In Column 3, Line 48, delete "evolution" and insert -- evolved --, therefor.
In Column 4, Line 21, delete "public" and insert -- packet --, therefor.
In Column 5, Line 53, delete "preforms" and insert -- performs --, therefor.
In Column 6, Line 36, delete "for" and insert -- used for --, therefor.
In Column 6, Line 58, delete "encrypted," and insert -- being encrypted, --, therefor.
In Column 11, Line 27, delete "preformed" and insert -- performed --, therefor.

Signed and Sealed this
Second Day of December, 2025

John A. Squires
*Director of the United States Patent and Trademark Office*